(12) United States Patent
Kim

(10) Patent No.: US 11,599,281 B2
(45) Date of Patent: Mar. 7, 2023

(54) DATA PROCESSING APPARATUS AND VEHICLE HAVING THE SAME

(71) Applicants: HYUNDAI MOTOR COMPANY, Seoul (KR); KIA MOTORS CORPORATION, Seoul (KR)

(72) Inventor: Dong Ok Kim, Goyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 102 days.

(21) Appl. No.: 17/126,759

(22) Filed: Dec. 18, 2020

(65) Prior Publication Data

US 2021/0405895 A1    Dec. 30, 2021

(30) Foreign Application Priority Data

Jun. 24, 2020 (KR) .................. 10-2020-0077386

(51) Int. Cl.
 *G06F 3/06*     (2006.01)
 *B60R 16/023*   (2006.01)
 *B60R 16/00*    (2006.01)

(52) U.S. Cl.
 CPC .......... *G06F 3/0631* (2013.01); *B60R 16/005* (2013.01); *B60R 16/023* (2013.01); *G06F 3/0604* (2013.01); *G06F 3/0676* (2013.01); *G06F 3/0677* (2013.01); *G06F 3/0679* (2013.01)

(58) Field of Classification Search
 CPC .... G06F 3/0631; G06F 3/0604; G06F 3/0676; G06F 3/0677; G06F 3/0679; G06F 3/0614; G06F 3/0653; G06F 3/0673; G06F 13/387; G06F 3/065; G06F 12/023; G06F 13/4022; B60R 16/005; B60R 16/023; G05B 23/0221; H04L 49/351; H04L 49/9078; B60Y 2306/15
 See application file for complete search history.

(56) References Cited

U.S. PATENT DOCUMENTS

| | | | |
|---|---|---|---|
| 2010/0332072 A1* | 12/2010 | Ishiko | B60T 17/221 701/29.5 |
| 2016/0378457 A1* | 12/2016 | Adachi | H04L 63/0876 713/181 |
| 2017/0278320 A1* | 9/2017 | Isozaki | G06F 13/4027 |
| 2019/0042738 A1* | 2/2019 | Juliato | H04W 12/122 |
| 2019/0356608 A1* | 11/2019 | Tanaka | H04B 7/15528 |
| 2020/0097216 A1* | 3/2020 | Marcu | G06F 3/0659 |
| 2020/0168088 A1* | 5/2020 | Goluguri | G08G 1/205 |
| 2020/0193741 A1* | 6/2020 | Cho | G07C 5/10 |
| 2021/0011709 A1* | 1/2021 | Itatsu | B60R 16/02 |
| 2021/0325198 A1* | 10/2021 | Chen | H04W 4/029 |
| 2021/0394726 A1* | 12/2021 | Choi | B60T 8/1755 |
| 2022/0363322 A1* | 11/2022 | Allmandinger | B62D 35/00 |

\* cited by examiner

Primary Examiner — Hiep T Nguyen
(74) Attorney, Agent, or Firm — Slater Matsil, LLP

(57) ABSTRACT

A data processing apparatus and a vehicle having the same are provided. A data processing apparatus of a vehicle includes: a first memory having a plurality of storage areas to which each address of a plurality of addresses is allocated; and a processor configured to confirm information of data received from a first device, confirm an address corresponding to the received data based on the confirmed information of data, and store the received data in a storage area of the plurality of storage areas corresponding to the confirmed address.

18 Claims, 8 Drawing Sheets

DATA PROCESSING APPARATUS AND VEHICLE HAVING THE SAME

CROSS-REFERENCE TO RELATED APPLICATION

This application is claims priority to and the benefit of Korean Patent Application No. 10-2020-0077386, filed on Jun. 24, 2020 the disclosure of which is incorporated by reference in its entirety.

TECHNICAL FIELD

The present disclosure relates to a data processing apparatus that controls transmission and reception of data between at least two devices, and a vehicle having the same.

BACKGROUND

In addition to basic driving functions, a vehicles performs additional functions for user convenience such as an audio function, a video function, a navigation function, an air conditioning function, a seat heating function and communication with an external terminal.

The vehicle may include electronic control devices and multimedia devices for controlling and performing driving functions and additional functions. These electronic control devices and multimedia devices transmit and receive data between each other using the same or different protocols and perform functions given to each other.

The vehicle further includes a communication device for transmitting and receiving data between devices that communicate with each other.

The communication device performs routing when communicating between different devices. These communication devices transmit data according to routing information when data is received.

Among devices, a device that transmits data transmits data regardless of whether the data is updated.

A device that receives data among the devices unconditionally processes the received data when data transmitted from another device is received regardless of whether the data is updated or the data required by the application. For this reason, there is a problem in that the load (interrupt processing, etc.) increases in the communication device and each device when communicating between devices.

In addition, when data required by the device is added, there is a problem in that the communication device needs to update routing information. When a device for receiving data is added, there is a problem in that the communication device needs to update routing information.

SUMMARY

Therefore, it is an aspect of the present disclosure to provide a data processing apparatus for storing data having a holding time and a value and transmitting the stored data to at least one controller, and a vehicle having the same.

In addition, it is another aspect of the present disclosure to provide a data processing apparatus for diagnosing a failure of a controller by duplicating stored data and analyzing patterns of duplicated data, and a vehicle having the same.

In addition, it is another aspect of the present disclosure to provide a data processing apparatus for transferring the duplicated data to a diagnostic device, and a vehicle having the same.

In accordance with one aspect of the disclosure, a data processing apparatus includes: a first memory having a plurality of storage areas to which addresses are each allocated; and a processor configured to confirm an information of the received data when data is received from the first device, confirm an address corresponding to the received data based on the confirmed information of data and store the received data in a storage area having the confirmed address.

The data may include at least one of a sensor data and a control data.

The sensor data may include information on a sensor value and a holding time to maintain storage of the sensor value.

The processor may be configured to maintain and control the storage of the sensor value during the holding time when the sensor data is received.

The sensor data may include a sensor value and a controller state value of a first controller provided in the first device.

The controller state value may include a feedback value for a control command of a second controller provided in a second device.

The control data may include at least one of a control input value for controlling a first controller provided in the first device and a control output value for controlling a second controller provided in a second device.

The processor may be configured to transmit a data stored in the first memory to a device requesting data transmission when a data transmission request is received from the first device or the second device.

The data processing apparatus may further include: a second memory, and the processor may be configured to duplicate the data stored in the first memory and store it in the second memory.

The processor may be configured to confirm the change for each data for the data stored in the second memory, confirm an abnormal state for each data based on the confirmed change for each data, diagnose a failure of the controller of the device that transmitted the data in abnormal state and transmit the failure information to the controller of the device diagnosed as the failure.

The data processing apparatus may further include: a third memory, and the processor may be configured to store the received external data in the third memory when an external data is received from an external device.

The processor may be configured to duplicate the data stored in the first memory and store it in the third memory.

The external data may include an information on a holding time.

In accordance with another aspect of the disclosure, a vehicle includes: a plurality of devices configured to transmit and receive data; and a communication device configured to confirm an information of the received data when data is received from a first device among the plurality of devices, confirm an address corresponding to the received data based on the confirmed information of data, store the received data in a storage area having the confirmed address and transmit the data stored in the first memory to a second device when a data transmission request is received from the second device among the plurality of devices.

The communication device may include a plurality of switches, and a data processing apparatus connected to the plurality of switches and configured to store a data received from the plurality of switches, and one or more devices of the plurality of devices may be connected to each switch.

The data processing apparatus may include a first memory and a second memory each having a plurality of storage areas to which addresses are each allocated, and the second memory may be configured to duplicate data stored in the first memory and store it.

The data to be stored in each of the addresses may be set in the first memory.

The communication device may be configured to confirm the change for each data for the data stored in the second memory, confirm an abnormal state for each data based on the confirmed change for each data, diagnose a failure of the controller of the device that transmitted the data in abnormal state and transmit the failure information to the controller of the device diagnosed as the failure.

The data processing apparatus may further include a third memory, and the data processing apparatus may be configured to store the received external data in the third memory when an external data is received from an external device.

The data may include at least one of a sensor data and a control data, and the sensor data may include information on a sensor value, a controller state value, and a holding time to maintain storage of the sensor value, and the control data may include at least one of a control input value for controlling a controller that receives data and a control output value for controlling a controller that transmits data.

DRAWINGS

These and/or other aspects of the disclosure will become apparent and more readily appreciated from the following description of the embodiments, taken in conjunction with the accompanying drawings of which:

DETAILED DESCRIPTION

Figure 1:
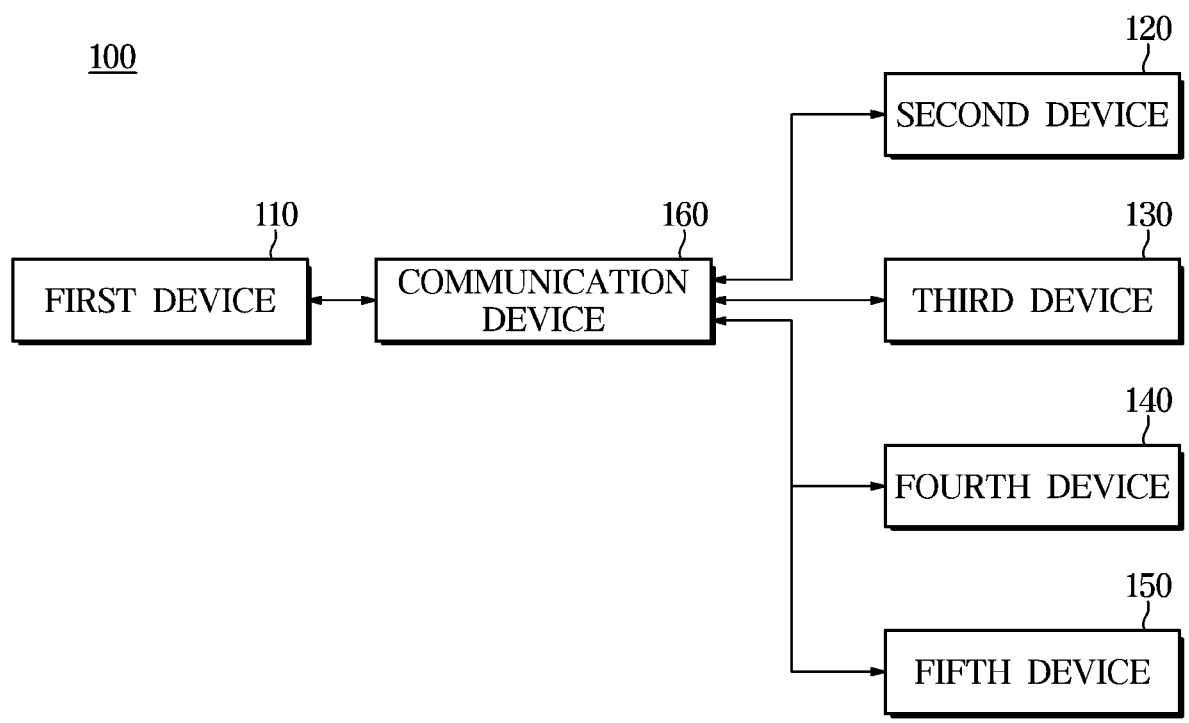
FIG. 1 is a control configuration diagram of a vehicle with a communication device in one form of the present disclosure.

Like reference numerals refer to like elements throughout. The present disclosure does not describe all elements of the embodiments, and overlaps between the general contents or the embodiments in the technical field to which the present disclosure belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

Figure 2:
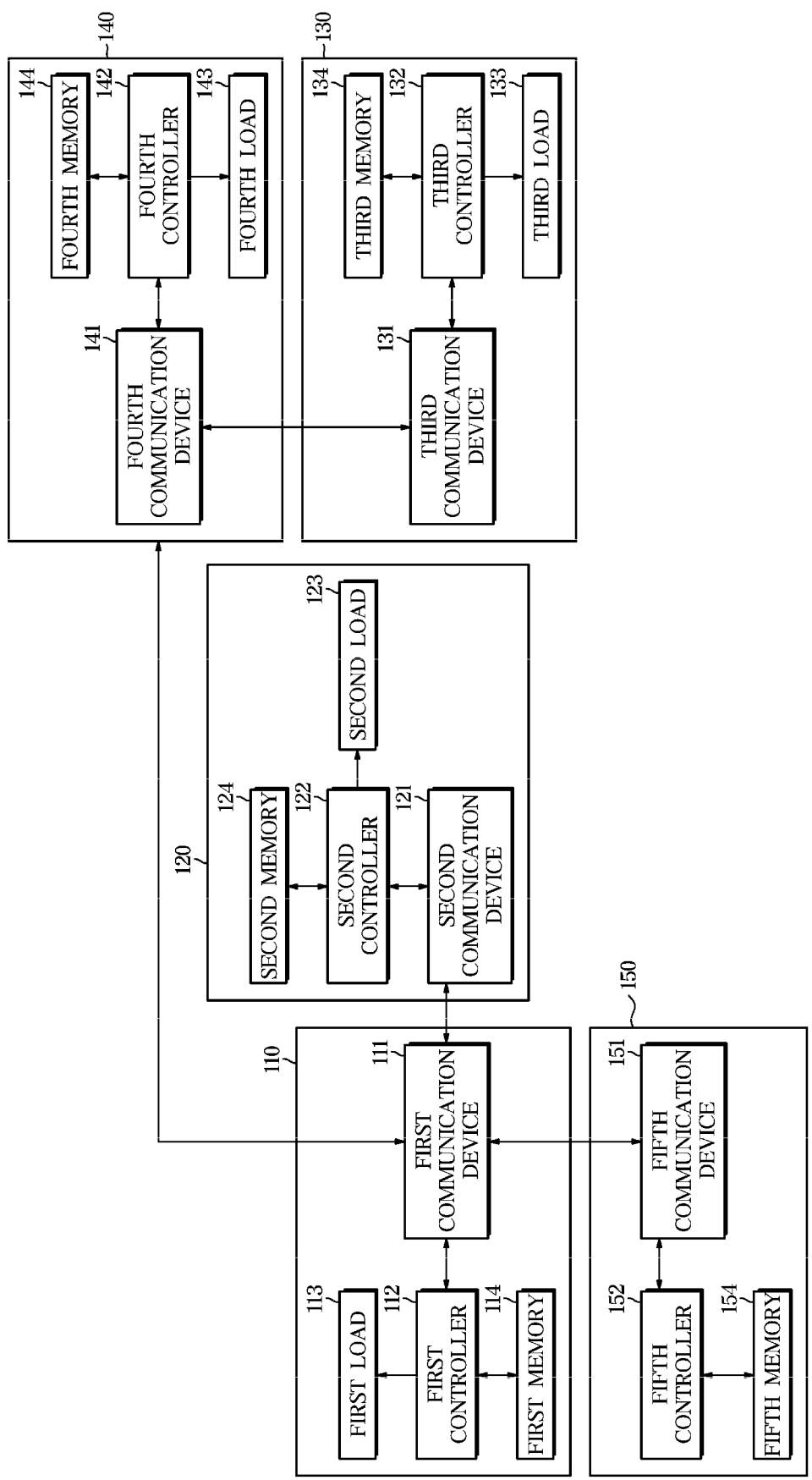
FIG. 2 is an exemplary diagram of a plurality of devices performing communication with a communication device in one form of the present disclosure.
Figure 3:
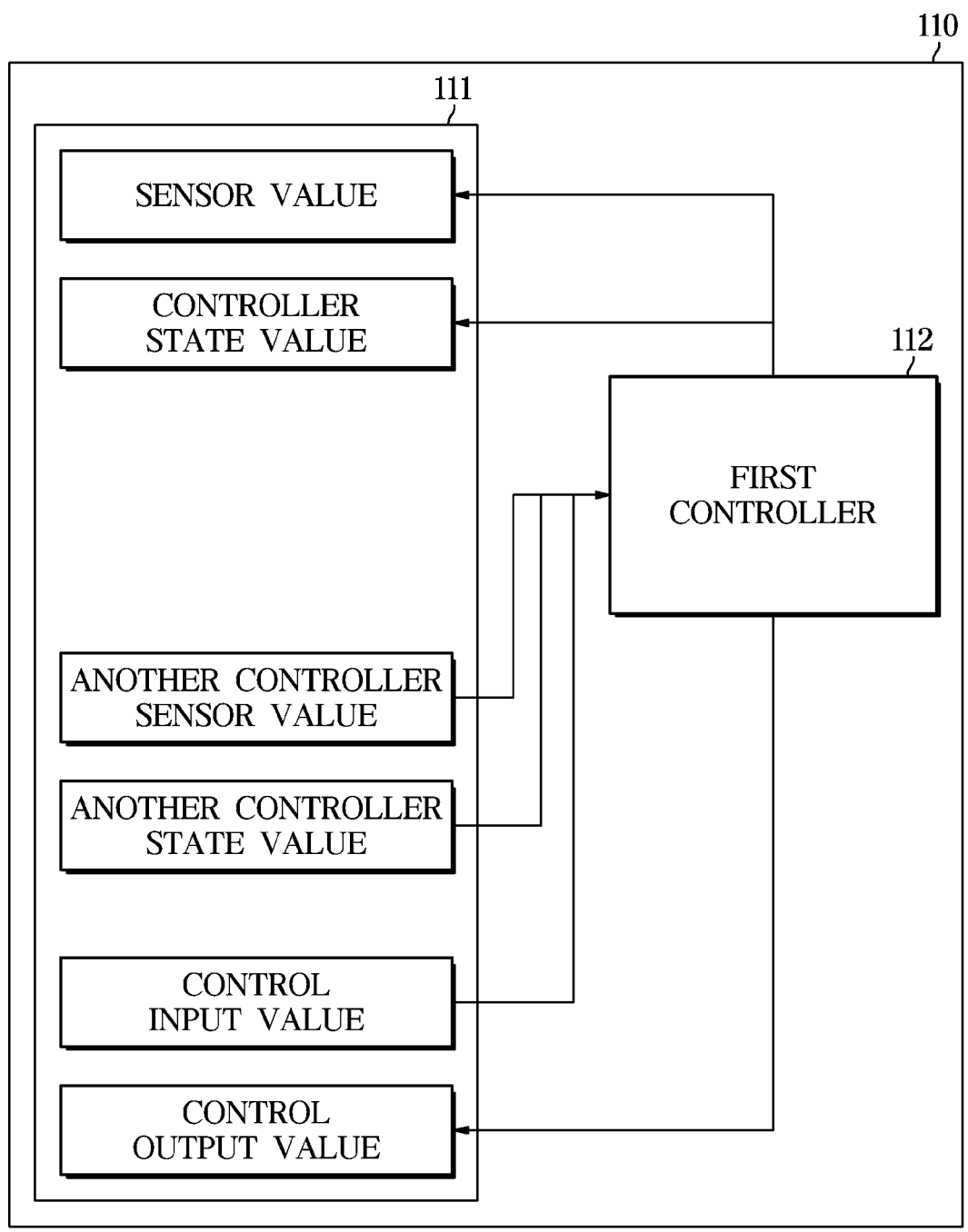
FIGS. 3 and 4 are detailed configuration diagrams of a device communicating with a communication device in one form of the present disclosure.
Figure 4:
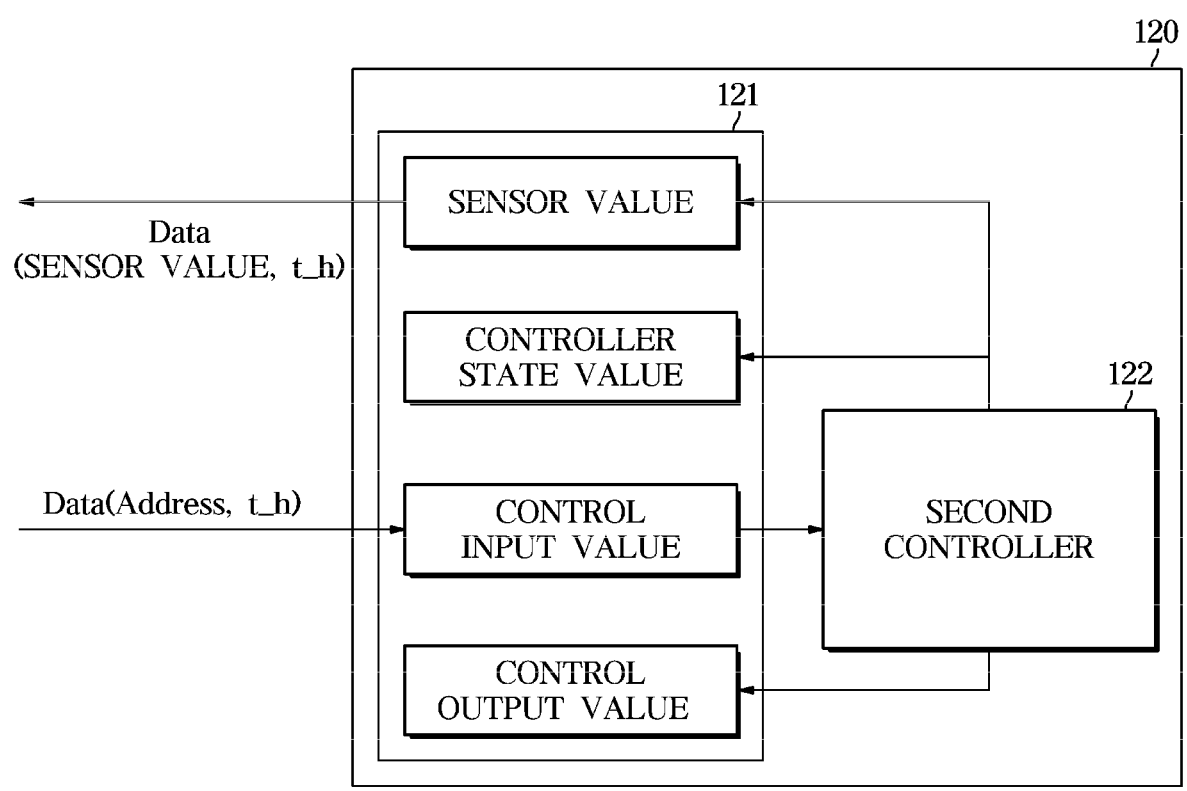

FIG. 1 is a control configuration diagram of a vehicle with a communication device in some forms of the present disclosure. FIG. 2 is an exemplary diagram of a plurality of devices performing communication with a communication device in some forms of the present disclosure. FIGS. 3 and 4 are detailed configuration diagrams of a device communicating with a communication device in some forms of the present disclosure.

As shown in FIG. 1, the vehicle 100 includes a plurality of devices 110, 120, 130, 140, 150 that perform at least one function, and a communication device 160 for transmitting and receiving data between the plurality of devices 110, 120, 130, 140, 150.

A plurality of devices provided in a vehicle will be described as an example.

A plurality of devices may be provided on the body and chassis of the vehicle.

The device provided on the exterior of the vehicle body may include a tail gate, front, rear, left and right doors, window glasses, and side mirrors that provide a driver with a view of the rear of the vehicle.

Devices provided in the interior of the vehicle may include an instrument panel (i.e. cluster) disposed on the dashboard and displaying driving information and state information, a position adjusting device that adjusts the front and rear position and height of the seat on which the occupant sits, a heating wire for supplying heat to the seat, a head unit provided in a center fascia, a vehicle terminal (AVN), and a ventilation device for circulating air in the seat.

The head unit is connected to various loads that perform audio functions, radio functions, air conditioning functions, and seat heating functions, ventilation functions, navigation functions, DMB functions, and telephone functions. The head unit receives an operation command for performing each function and controls the operation of each function based on the input operation command or transmits an operation command to a corresponding load.

The vehicle terminal includes an input device and a display. When at least one of the navigation function, DMB function, audio function, video function, phone function, and radio function is selected, the vehicle terminal may perform at least one selected function and display operation information of the function being performed. The vehicle terminal may be a multimedia device.

The input device and the display of the vehicle terminal may be provided as a touch screen.

Devices provided on the chassis of the vehicle further include a power generating device, a power transmission device, a traveling device, a steering device, a braking device, a suspension device, a transmission device, a fuel device, front, rear, left and right wheels, and various safety devices.

The device provided on the chassis of the vehicle may include various sensors such as a wheel speed sensor, an acceleration sensor, a steering angle sensor, a rain sensor, a yaw sensor, a pressure sensor, an obstacle sensor, and the like.

The vehicle 100 includes devices provided on the body and chassis, and an electronic control unit (referred to as an ECU, controller) for controlling various sensors.

Here, the ECU may be provided for each device, or may be provided as one so as to integrally control a plurality of devices.

A plurality of devices 110, 120, 130, 140 and 150 provided in the vehicle may communicate with each other using the communication device 160, and transmit and receive various data for performing at least one function during communication.

The plurality of devices 110, 120, 130, 140, and 150 may be electrically, mechanically and communicatively connected to each other through the communication device 160.

As shown in FIG. 2, each device 110, 120, 130, 140 and 150 may include a transceiver 111, 121, 131, 141, 151 that communicates with other devices through the communication device 160, a controller 112, 122, 132, 142, 152 that generates control data based on data received through the transceiver 111, 121, 131, 141, 151 and an internal program, and a memory 114, 124, 134, 144, 154 that stores data for each address and stores identification information (ID) of the controller.

Some of the plurality of devices 110, 120, 130, and 140 may include the loads 113, 123, 133, and 143 that operate in response to a control signal of the controller.

Among the plurality of devices, the remaining device 150 transmits control data of the controller 152 to another device, so that the load in the other device is operated by the control data.

That is, the controller of some devices may be a load controller that controls the operation of the load in the device. In addition, the controller of the remaining device may be a function execution controller for controlling some of functions that may be executed by a load provided in another device.

For example, the first device 110 may be a vehicle terminal (AVN), the second device 120 may be a wireless communication device, the third device 130 may be a cluster, and the fourth device 140 may be a head unit, and the fifth device 150 may be a wheel speed sensor.

The transceivers 111, 121, 131, 141, and 151 of each device transmit and receive data based on the control command of the controllers 112, 122, 132, 142, and 152.

The controllers 112, 122, 132, 142, and 152 of each device control the transceivers 111, 121, 131, 141, and 151 to transmit data to another device or communication device 160.

Each device controller 112, 122, 132, 142 and 152 has a unique identification information (ID) or IP address. Here, the unique identification information may be preset information.

When transmitting data to the communication device, the controllers 112, 122, 132, 142, and 152 of each device may transmit their own IP address or identification information together.

In addition, the controllers 112, 122, 132, 142, and 152 of each device may store identification information and IP addresses of controllers of other devices.

The controllers 112, 122, 132, 142, and 152 of each device may request data necessary for the communication device.

The controllers 112, 122, 132, 142, and 152 of each device may receive data transmitted from the communication device 160.

The controller of each device may share data with the communication device 160. That is, the controller of each device may share data with other devices through the communication device.

Here, the transmitted/received data may include at least one of sensor data and control data.

The sensor data includes at least one of a sensor value and a controller state value. Here, the controller state value may include a feedback value for a command of another controller.

The sensor data may further include information on the holding time. Here, the holding time is information on the time during which the data processing apparatus 164 (refer to FIG. 5) in the communication device should maintain the sensor value.

The holding time of the sensor value may be set based on the activation state of the controller.

When the vehicle is turned off/on within the holding time, the data processing apparatus in the communication device may hold the sensor value as much as the holding time.

With reference to FIG. 3, data transmission/reception of a device will be described. A first device among a plurality of devices will be described as an example.

As shown in FIG. 3, the first controller 112 of the first device 110 may transmit a sensor value, which are sensor data, and a controller state value through the first transceiver 111.

Here, the controller state value may be a value corresponding to a state of the first controller, for example, a normal state, an abnormal state, an activation state, a sleep state, and the like.

The first controller 112 of the first device 110 may receive another controller sensor value and another controller state value, which are sensor data of another device, through the first transceiver 111. Here, sensor data of another device is data transmitted through the communication device 160.

The first controller 112 of the first device 110 may control the operation of the first device based on the received sensor data.

The first controller 112 of the first device 110 may receive control data or transmit control data through the communication device 160.

Here, the control data is a value for controlling the controller, and may include at least one of a control input value for the controller of another device to control the controller of the first device, and a control output value for the controller of the first device to control another controller.

The control data may include a holding time during which the control input value and control output value should be maintained.

The first controller 112 of the first device 110 may control the storage of sensor data and control data.

The first controller 112 of the first device 110 may confirm addresses corresponding to sensor data and control data, and control the first memory 114 so that sensor data and control data are stored at each of the confirmed addresses.

The controller of each device may store a combination of a unique memory area within each controller and identification information (ID) of each controller. The controller of each device may store information about the shared ID and address.

The controller of a device capable of wireless communication among devices provided in a vehicle may receive data transmitted from an external device of the vehicle. This will be described with reference to FIG. 4. In addition, a second device among a plurality of devices will be described as an example.

As shown in FIG. 4, the second controller 122 of the second device 120 receives data transmitted from an external device through the second transceiver 121 and transmits the received data to another device through the second transceiver 121.

The data received at this time is control data and may include a control input value.

The second controller 122 of the second device 120 may generate a control output value to control another device or a sensor value based on the received control input value.

The second controller 122 of the second device 120 may generate a holding time of the control output value when transmitting the control output value through the transceiver 121 and transmit information about the generated holding time together with the control output value.

In addition, the holding time corresponding to the control output value may be preset information. This holding time may be stored for each control output value, and may be stored for each address in which the control output value is stored.

The holding time corresponding to the control output value may be information set in the external device, and may be changed by the external device.

The second controller 122 of the second device 120 may generate a holding time of the sensor value when transmitting the sensor value through the transceiver 121 and transmit information about the generated holding time together with the sensor value. In addition, the holding time corresponding to the sensor value may be preset information. This holding time may be stored for each sensor value, and may be stored for each address where the sensor value is stored.

The holding time corresponding to the sensor value may be information set in the external device and may be changed by the external device.

The data transmitted from the external device may include at least one of update data of at least one device, V2X (or V2C) data to control at least one device, and streaming data to be output through at least one device.

For these data, the holding time to be maintained in the vehicle may vary depending on the characteristics of the data and the user. For example, the holding time of V2X data may be a few seconds or several minutes, the update data may be a time until the update of at least one device is completed, and the streaming data may be a time until the user ends the use of the content.

In this case, the external device may set a holding time and transmit a control input value together with the set holding time to the second device. It is also possible for an external device to change the holding time.

The controller 112, 122, 132, 142 and 152 of each device may be implemented using a memory (not shown) storing an algorithm for controlling an operation of components in the controller and data related to programs implementing the algorithm, and a processor (not shown) performing the above mentioned operation using the data stored in the memory. The memory and the processor may be implemented in separate chips, or a single chip.

When memory is provided in the controllers 112, 122, 132, 142, 152 of each device, data may be stored in a unique memory area of the memory within the controllers 112, 122, 132, 142, 152 of each device.

The controllers 112, 122, 132, 142, and 152 of each device may store combination information obtained by combining identification information of the controller and information of a unique memory area. Here, the unique memory area may be a storage area, and information on the memory area may be an address.

The combination information may include identification information (ID) and an address of a share to be shared with other devices.

The controllers 112, 122, 132, 142, and 152 of each device may be provided separately from the memories 114, 124, 134, 144, and 154.

Each device memory 114, 124, 134, 144, 154 has a unique identification information (ID). Here, the unique identification information may be preset information.

Each device's memory 114, 124, 134, 144, 154 has a plurality of storage areas. Here, the plurality of storage areas may be divided into addresses. Data stored for each address may be preset.

That is, each data is stored in memory but may be stored in a storage area with a preset address.

The memories 114, 124, 134, 144, and 154 of each device may be a memory in which a program for controlling the operation of a load is stored, or a memory in which a program for performing at least one function is stored.

Each device's memory 114, 124, 134, 144 and 154 may be implemented by at least one of nonvolatile memory devices such as cache, Read Only Memory (ROM), Programmable ROM (PROM), Erasable Programmable ROM (EPROM), Electrically Erasable Programmable ROM (EEPROM), and Flash memory, or volatile memory devices such as random access memory (RAM), or a storage medium such as a hard disk drive (HDD) and a CD-ROM, but is not limited thereto.

When transmitting data from one of the plurality of devices 110, 120, 130, 140, 150 to another device, the communication device 160 sets a route for transmitting data to another device, and stores the set route as routing information and controls data transmission along the set route.

The communication device 160 is a device capable of at least one communication among wired communication and wireless communication, and may relay communication between at least two devices.

The communication device 160 may be a switching hub for Ethernet that transmits a packet received from one port to another device through another port or may be a gateway.

The communication device 160 may include any one of an access point (AP), a router, and a point to point.

The communication device 160 may be implemented as one device or a plurality of devices.

The communication device 160 may include one or more components that enable communication with a device inside the vehicle and an external device, and may include, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, a Zigbee communication module, and so on.

Wired communication modules include various wired communication modules such as Controller Area Network (CAN) communication modules, Local Area Network (LAN) modules, Wide Area Network (WAN) modules, or Value Added Network (VAN) modules. In addition, the wired communication module includes various cable communication modules such as USB (Universal Serial Bus), HDMI (High Definition Multimedia Interface), DVI (Digital Visual Interface), RS-232 (recommended standard232), power line communication, or plain old telephone service (POTS). Here, the local area network (LAN) module is the most typical bus structure type Ethernet communication.

In addition to the Wi-Fi module and the WiBro module, the wireless communication module may include a wireless communication module supporting various wireless communication methods such as Global System for Mobile Communication (GSM), Code Division Multiple Access (CDMA), Wideband Code Division Multiple Access (WCDMA), and universal mobile telecommunications system (UMTS), TDMA (Time Division Multiple Access), LTE (Long Term Evolution), etc.

In the present embodiment, the communication device 160 will be described as an example of a communication device for performing Ethernet communication.

The communication device 160 generates a route to transmit data between a plurality of devices, stores the generated route as routing information, and performs Ethernet communication between a plurality of devices based on the generated route.

Figure 5:
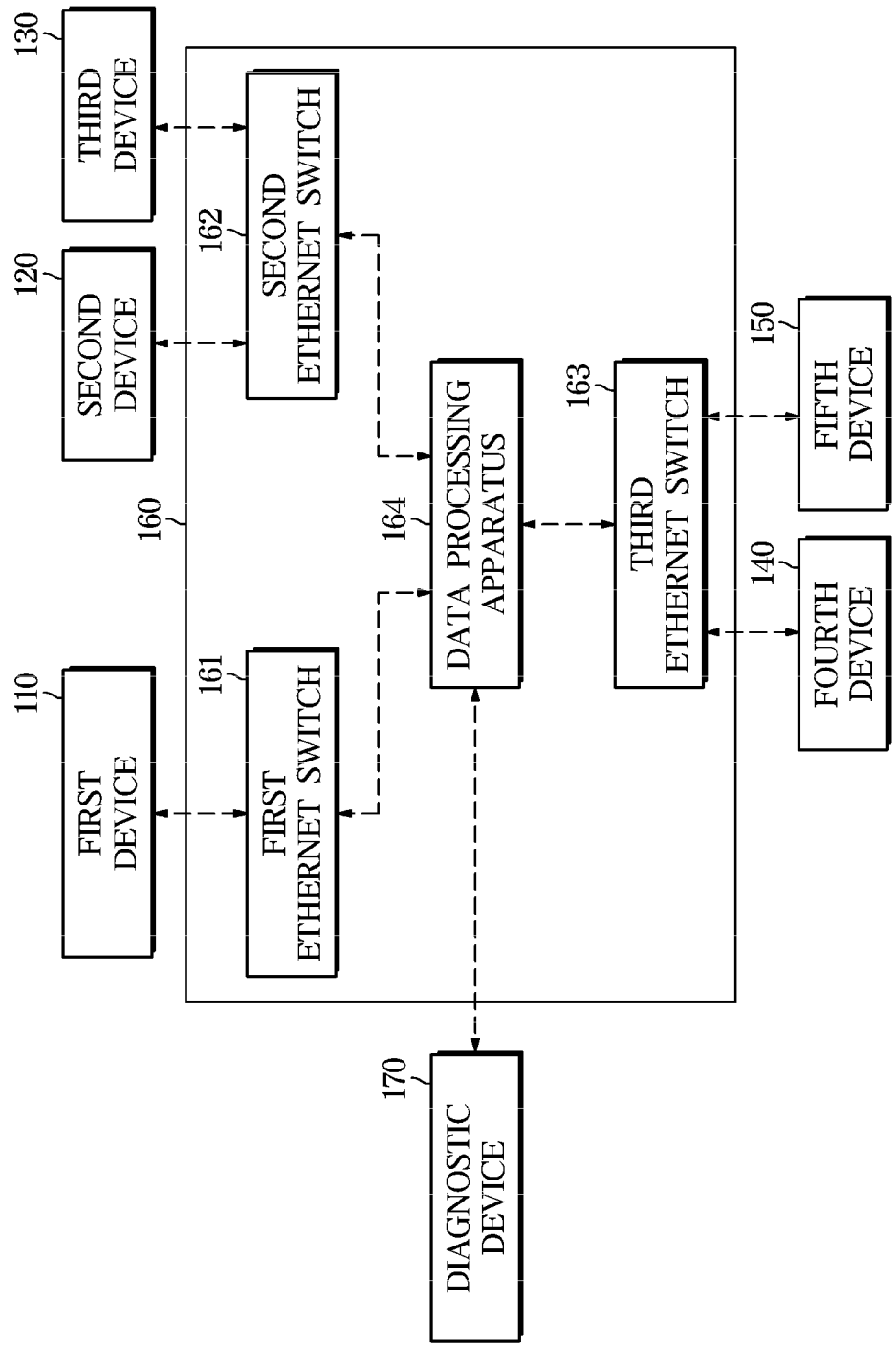
FIG. 5 is a configuration diagram of a communication device in one form of the present disclosure.
Figure 6:
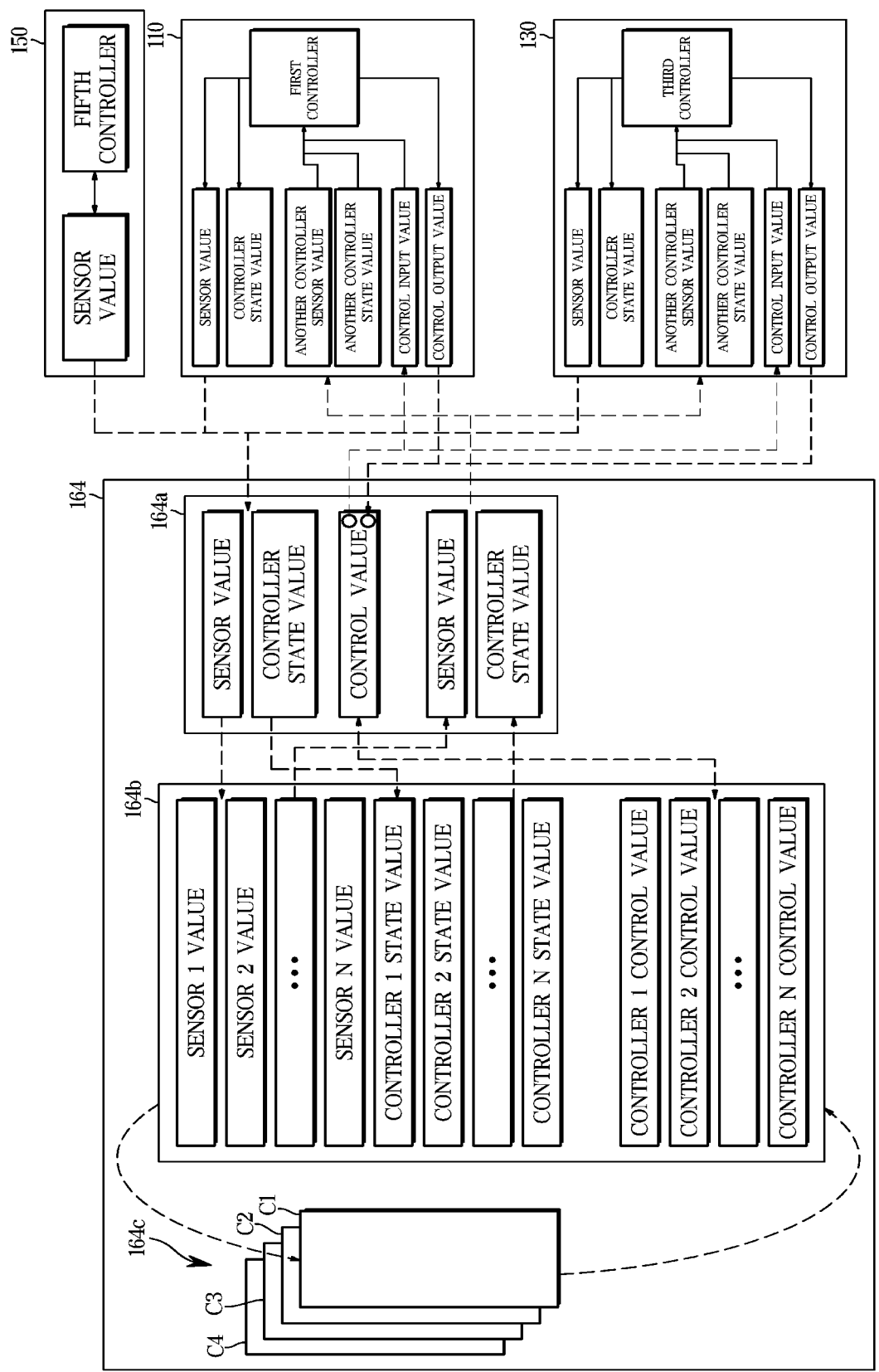
FIG. 6 is a detailed configuration diagram of a communication device in one form of the present disclosure.

As shown in FIG. 5, the communication device 160 may include a plurality of switches 161-163 and a data processing apparatus 164 connected to the plurality of switches 161-163 to transmit and receive data to and from the plurality of devices 110-150.

The plurality of switches 161-163 may be Ethernet switches.

One or a plurality of devices may be connected to each of the Ethernet switches 161-163.

Each of the Ethernet switches 161-163 may transmit data to at least one device in response to a control command of the data processing apparatus 164 or transmit data received from at least one device to the data processing apparatus 164.

Each of the Ethernet switches 161-163 may store IP addresses of a plurality of controllers and IP addresses of a data processing apparatus.

Each of the Ethernet switches 161-163 may generate a route based on the confirmed IP address when an IP address is confirmed from the received data, and control transmission of received data along the generated route.

Each of the Ethernet switches 161-163 may store route to be transmitted for a plurality of data as routing information.

Each of the Ethernet switches 161-163 may generate a route between the controller of at least one device and the data processing apparatus 164.

For example, the second Ethernet switch 162 may generate a route connecting the controller of the second device and the data processing apparatus in response to the received data, or generate a route connecting the controller of the third device and the data processing apparatus.

The second Ethernet switch 162 may generate a route connecting the controller of the second device 120 and the data processing apparatus 164 in response to a data transmission request from the controller of the second device 120 and may generate a route connecting the controller of the third device 130 and the data processing apparatus in response to a data transmission request from the controller of the third device 130.

The data processing apparatus 164 may share data with a plurality of devices.

The data processing apparatus 164 stores data received through a plurality of Ethernet switches, and transmits the stored data to the controller that requests data transmission in response to a data transmission request from the controller.

The data processing apparatus 164 includes a processor 164a, a main memory 164b (referred to as first memory), a plurality of duplicate memories 164c (c1, c2, c3, c4 and referred to as second memory) and may further include a third memory 164d. The data processing apparatus 164 may include a multiplexed memory.

The processor 164a receives data received through at least one Ethernet switch, classifies the received data based on the received data information, and stores the classified data in first memory. Classifying the received data here is to classify identification information of data, type of data, and the like.

An address to be stored for each data may be set in the processor 164a. The processor 164a confirms an address corresponding to the classified data and stores the data in the confirmed address.

For example, the processor 164a stores the sensor value from the first address to the tenth address of the main memory 164b, and stores the controller state value from the eleventh address to the 20th address of the main memory 164b, and stores the control value from the 21st address to the 30th address of the main memory 164b.

Data processed by the processor 164a may include sensor data and control data. The sensor data may include a sensor value and a controller state value, and the control data may include a control value, but may include a control input value and a control output value.

The sensor data may include a sensor value and a holding time, and a control input value and a control output value may also include a holding time.

The controller state value may be a feedback value. For example, when the second controller of the second device transmits a control command to the first controller of the first device, the first controller of the first device may output a feedback value corresponding to response data for the received control command to the data processing apparatus as a controller state value.

As described above, when the first controller of the first device outputs the feedback value as the controller state value, the processor may receive the feedback value as the control state value of the first controller.

When a data transmission request is received from the controller of any one device, the processor 164a transmits the data stored in the main memory 164b to the controller of any one device.

When storing control data, the processor 164a may also store information on the history. When storing control data, the processor 164a may also store control data as control data with a history or control data without a history.

The processor 164a may divide and store control data with a history and control data without a history.

The processor 164a may store data stored in the main memory 164b in at least one duplication memory. That is, the processor 164a may duplicate data stored in the main memory 164b to at least one of the duplication memories 164c (c1, c2, c3, and c4).

The main memory 164b has a plurality of storage areas. Addresses may be set in a plurality of storage areas. The main memory 164b stores data processed by the processor 164a. The main memory 164b stores data based on an address set for each data.

The duplication memories 164c (c1, c2, c3 and c4) have a plurality of storage areas. Addresses are set for the plurality of storage areas.

At least one of the duplication memories 164c (c1, c2, c3, and c4) may store data based on an address set for each data.

The processor 164a does not directly use the data collected by the vehicle for data used in the vehicle internal network, but uses the duplicated information.

Main memory 164b and memories for duplicate 164c (c1, c2, c3, c4) may be implemented by at least one of nonvolatile memory devices such as cache, Read Only Memory (ROM), Programmable ROM (PROM), Erasable Programmable ROM (EPROM), Electrically Erasable Programmable ROM (EEPROM), and Flash memory, or volatile memory devices such as random access memory (RAM), or a storage medium such as a hard disk drive (HDD) and a CD-ROM, but is not limited thereto.

Figure 7:
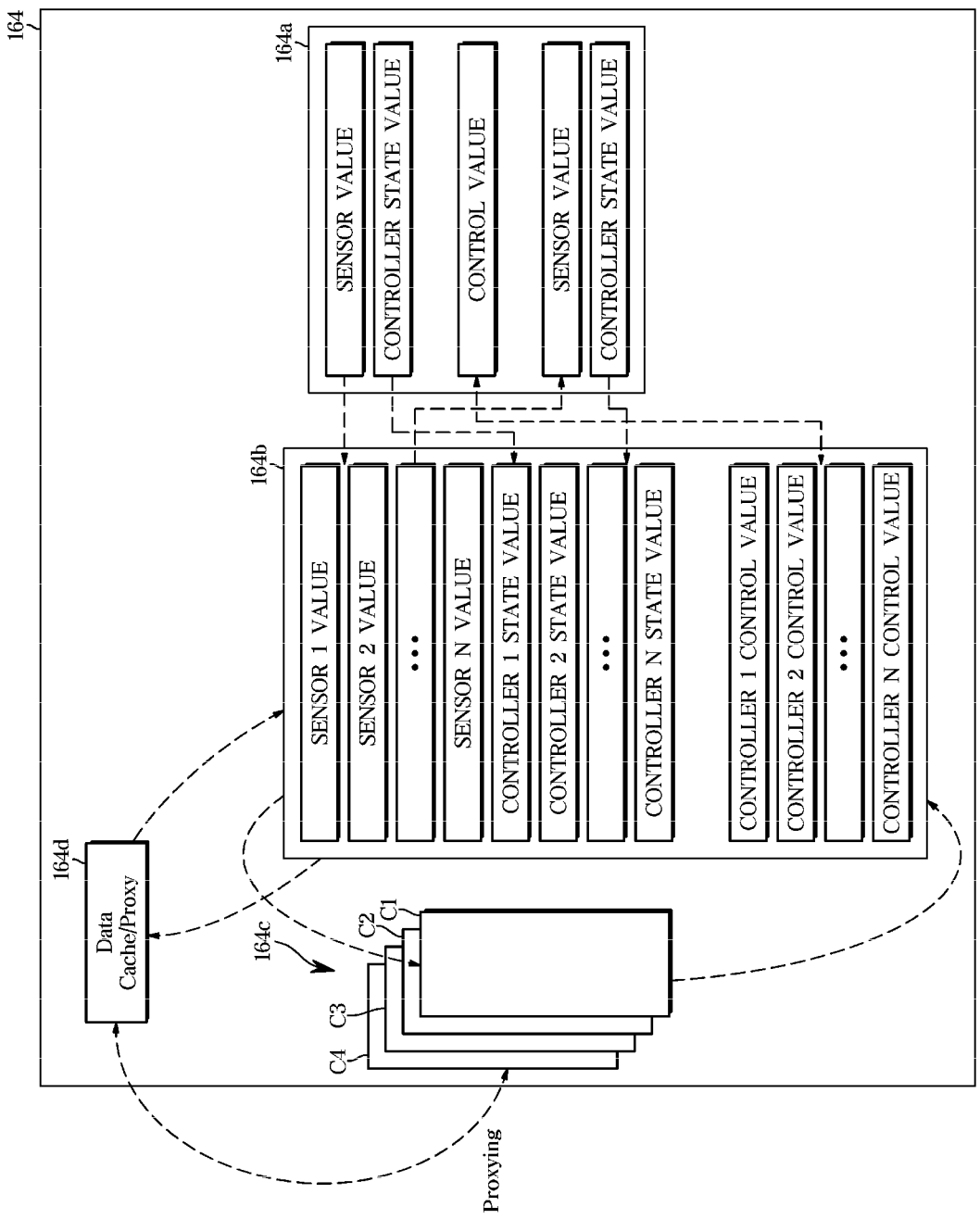
FIGS. 7 and 8 are diagrams illustrating modifications of a communication device in one form of the present disclosure.

As illustrated in FIG. 7, the data processing apparatus 164 may further include a third memory 164d.

The third memory 164d may be a cache memory or a proxy memory, and may be a cache and a proxy memory.

The third memory 164d stores data, but may store data during the holding time. Through this, the third memory 164d may enable data to be used redundantly and secure communication safety.

The third memory 164d may store data transmitted from an external device, and may provide stored data to at least one device in response to a control command of the processor 164a.

Through this, the present embodiment may be made not affected by the external communication state. In addition, the downloaded data may be reused, such as overlapping media playback, and may be linked with the cloud.

By storing the data transmitted from the external device in the third memory 164d, even in the event of a failure of the third memory 164d, it is possible to avoid affecting the transmission and reception of data in the vehicle.

The data processing apparatus 164 may confirm the change for each data stored in the main memory 164b or the duplication memory 164c, analyze the pattern for each data based on the change for each confirmed data, and diagnose a failure of a controller that has transmitted corresponding data for each data based on the analysis result.

The data processing apparatus 164 may determine that the controller that transmitted the data is in a normal state when it is determined that the change amount of the confirmed data is within the reference range, and determine that the controller that transmitted the data is in a failure state when the change amount of the confirmed data is out of the reference range. When the change amount of the confirmed data is out of the reference range, it is possible to determine it as a network error with the controller that transmitted the data, or hacking.

When the data processing apparatus 164 determines that the number of data out of the reference range is greater than or equal to a predetermined number, the data processing apparatus 164 may determine that it is hacking.

Here, the reference range may be an amount between the minimum amount and the maximum amount of change of the data value of the change amount.

As described above, the data processing apparatus 164 may collect the entire vehicle data and determine it as contamination (failure/hacking) of the relevant part if there is an intrusion using the Network Intrusion Detection System (IDS) of the data.

The data processing apparatus 164 may also transmit information on a failure state to a controller diagnosed as a failure.

The data processing apparatus 164 may store information about abnormal states of data and failure state of the controller, and transmit information about the failure state stored in the diagnostic device when the diagnostic device is connected.

Figure 8:
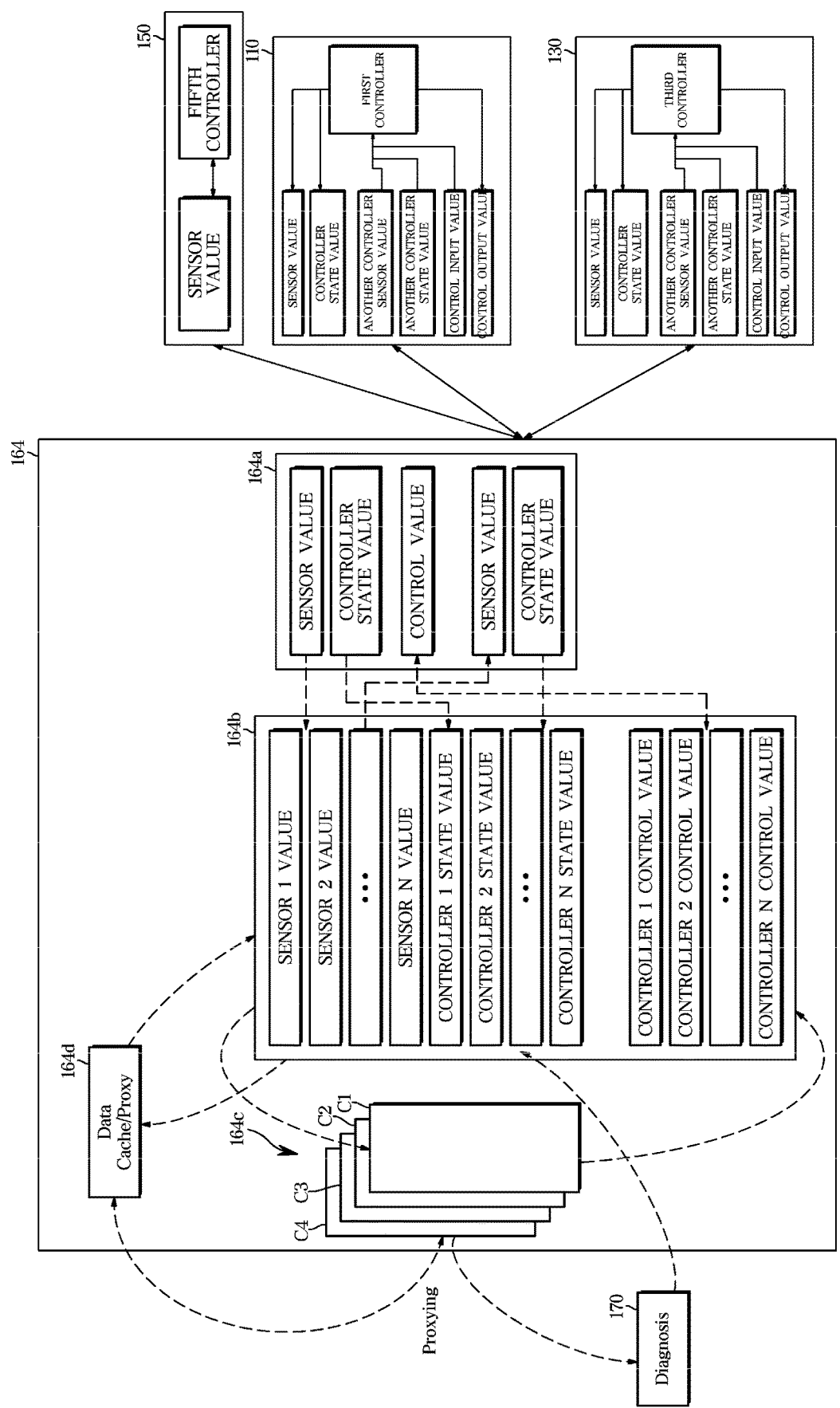

As shown in FIG. 8, the data processing apparatus 164 may be connected to the diagnostic device 170. The diagnostic device 170 may be detachably connected to the data processing apparatus 164.

The diagnostic device 170 may communicate with the data processing apparatus 164, receive data stored in the duplication memory 164c of the data processing apparatus, confirm the change for each data for the received data, diagnose an abnormal state of data based on a change for each confirmed data, and display failure information about a controller that has transmitted the data diagnosed as the abnormal state.

The diagnostic device 170 may confirm the identification information of the controller and transmit failure information on the controller having the confirmed identification information to the data processing apparatus.

The data processing apparatus may be implemented using a memory (not shown) storing an algorithm for controlling an operation of components in the communication device and data related to programs implementing the algorithm, and a processor (not shown) performing the above mentioned operation using the data stored in the memory. The memory and the processor may be implemented in separate chips, or a single chip.

At least one component may be added or deleted corresponding to the performance of the components of the vehicle and communication device shown in FIGS. 1, 2, 3, 4, 5, and 6. In addition, it will be readily understood by those of ordinary skill in the art that the mutual positions of the components may be changed corresponding to the performance or structure of the vehicle.

Meanwhile, each of the components shown in FIGS. 1, 2, 3, 4, 5, and 6 refers to a software and/or Field Programmable Gate Array (FPGA) and a hardware components such as Application Specific Integrated Circuit (ASIC).

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

Since present disclosure transmits data to various devices using a data processing apparatus, the flow of data can be simplified. In addition, present disclosure can prevent unnecessary data update by transmitting data with holding time and value to various devices.

The present disclosure can simplify the wiring for communication, thereby reducing the manufacturing cost.

In the present disclosure, even when a device for receiving data is added or data required by an existing device is added, data stored in the data processing apparatus can be transmitted to a device that requires it, so the process of generating a route for data transmission can be reduced. In other words, the present disclosure does not require updating of routing information, and thus, it is very convenient to use the network in the vehicle because it is not necessary to change the software of all controllers according to changes in routing information.

The present disclosure can prevent the control timing of the corresponding device from being missed due to the delay in data transmission and reception due to the routing delay. This can prevent vehicle accidents that may occur.

In the present disclosure, redundancy can be easily performed through dual replication of the memory, and unnecessary physical changes can be reduced by this.

The present disclosure confirms the change of data pattern and monitors the state of the controller so that the abnormal state of the controller, that is, the failure state, can be determined quickly and easily.

The present disclosure can easily diagnose failure by diagnosing failure through dual replication of memory.

The present disclosure can reuse data and secure security through cache and proxy.

In addition, present disclosure can prevent an increase in manufacturing cost because the routing delay can be reduced only by changing the software without changing the hardware of the communication device and controller.

The present disclosure can improve the quality of communication devices and vehicles, and further increase user satisfaction and improve user convenience.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A data processing apparatus comprising:
a first memory having a plurality of storage areas to which each address of a plurality of addresses is allocated; and
a processor configured to:
confirm information of data received from a first device;
confirm an address corresponding to the received data based on the confirmed information of the data; and
store the received data in a storage area of the plurality of storage areas corresponding to the confirmed address,
wherein the data includes at least one of sensor data including a sensor value and a controller state value of a first controller provided in the first device, or control data, and
wherein the controller state value includes at least one of a normal state, an abnormal state, an activation state or a sleep state.

2. The data processing apparatus according to claim 1, wherein the sensor data comprises information on a holding time to maintain storage of the sensor value.

3. The data processing apparatus according to claim 2, wherein the processor is configured to maintain and control the storage of the sensor value during the holding time when the sensor data is received.

4. The data processing apparatus according to claim 1, wherein the controller state value comprises a feedback value for a control command of a second controller provided in a second device.

5. The data processing apparatus according to claim 1, wherein the control data comprises at least one of a control input value for controlling the first controller provided in the first device or a control output value for controlling a second controller provided in a second device.

6. The data processing apparatus according to claim 1, wherein the processor is configured to transmit data stored in the first memory to a device requesting data transmission when a data transmission request is received from the first device or a second device.

7. The data processing apparatus according to claim 1, wherein the data processing apparatus further comprises:
a second memory,
wherein the processor is configured to duplicate the data stored in the first memory and store the duplicated data in the second memory.

8. The data processing apparatus according to claim 7, wherein the processor is configured to:
confirm a change for each data of the data stored in the second memory;
confirm the abnormal state for each data based on the confirmed change for each data;
diagnose a failure of a controller of a device that transmitted the data in the abnormal state; and
transmit failure information to the controller of the device.

9. The data processing apparatus according to claim 1, wherein the data processing apparatus further comprises:
a third memory,
wherein the processor is configured to store external data received from an external device in the third memory.

10. The data processing apparatus according to claim 9, wherein the processor is configured to duplicate the data stored in the first memory and store the duplicated data in the third memory.

11. The data processing apparatus according to claim 9, wherein the external data comprises information on a holding time.

12. A vehicle comprising:
a plurality of devices configured to transmit and receive data; and
a communication device configured to:
confirm information of the data received from a first device of the plurality of devices;
confirm an address corresponding to the received data based on the confirmed information of the data;

store the received data in a first memory having the confirmed address; and transmit the data stored in the first memory to a second device when a data transmission request is received from the second device of the plurality of devices, wherein the data includes at least one of sensor data including a sensor value and a controller state value of a first controller provided in the first device, or control data, and wherein the controller state value includes at least one of a normal state, an abnormal state, an activation state or a sleep state.

13. The vehicle according to claim 12, wherein the communication device comprises:

a plurality of switches; and a data processing apparatus connected to the plurality of switches and configured to store data received from the plurality of switches, wherein at least one device of the plurality of devices is connected to each switch of the plurality of switches.

14. The vehicle according to claim 13, wherein the data processing apparatus comprises:

the first memory having a plurality of storage areas to which each address of a plurality of addresses is allocated; and a second memory having a plurality of storage areas to which each address of the plurality of addresses is allocated, wherein the second memory is configured to duplicate data stored in the first memory and store the duplicated data.

15. The vehicle according to claim 14, wherein the first memory is configured to set the data to be stored in each address of the plurality of addresses.

16. The vehicle according to claim 14, wherein the communication device is configured to:

confirm a change for each data of the data stored in the second memory;

confirm the abnormal state for each data based on the confirmed change for each data;

diagnose a failure of a controller of a device that transmitted the data in the abnormal state; and transmit failure information to the controller of the device.

17. The vehicle according to claim 14, wherein the data processing apparatus further comprises:

a third memory, wherein the data processing apparatus is configured to store an external data received from an external device in the third memory.

18. The vehicle according to claim 12, wherein the sensor data further comprises information on a holding time to maintain storage of the sensor value, and wherein the control data comprises at least one of a control input value for controlling a controller that receives the data or a control output value for controlling a controller that transmits the data.

* * * * *